S. & D. HARRIS.

Horse Hay Fork.

No. 56,936.   Patented Aug. 7, 1866.

UNITED STATES PATENT OFFICE.

SAMUEL HARRIS AND D. A. HARRIS, OF SHIPPENSBURG, PENNSYLVANIA.

IMPROVEMENT IN HORSE HAY-FORKS.

Specification forming part of Letters Patent No. 56,936, dated August 7, 1866.

*To all whom it may concern:*

Be it known that we, SAMUEL HARRIS and DANIEL A. HARRIS, of Shippensburg, Cumberland county, and State of Pennsylvania, have invented a new and Improved Horse Hay-Fork; and we do hereby declare that the following is a full, clear, and exact description thereof, which will enable others skilled in the art to make and use the same, reference being had to the accompanying drawings, forming part of this specification, in which—

Figure 1:
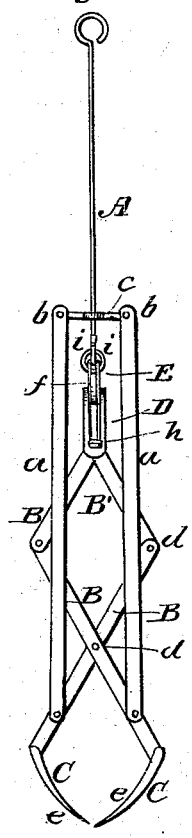
Figure 2:
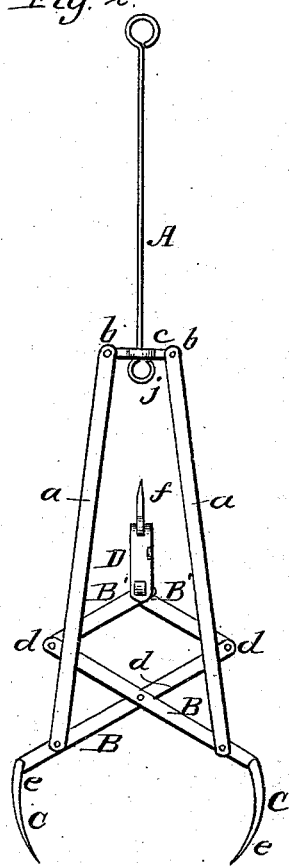
Figure 3:
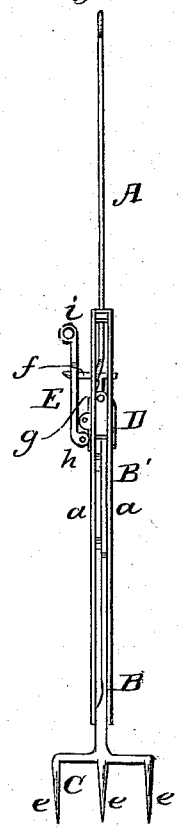

Figure 1 is a side view of our invention in a closed state; Fig. 2, a side view of the same in an open state; Fig. 3, an edge view of the same.

Similar letters of reference indicate like parts.

This invention relates to a new and improved hay-fork for unloading and elevating hay in barns and discharging the same by means of a horse or other draft-animal. The invention consists in a peculiar construction of the fork, as hereinafter fully shown and described, whereby the fork may be readily loaded and also readily tipped or actuated, so as to discharge its load at the proper time.

The fork is constructed with what may be termed a frame or main portion, composed of two pairs of bars, $a$, connected at their upper ends, by pivots $b$, to the ends of a cross-bar, $c$, the latter having a hole or opening at its center for a rod, A, to pass through loosely, the hoisting-rope being attached to the upper end of rod A.

B B B' B' represent two pairs of levers or arms, connected by pivots $d$, and arranged on the lazy-tongs principle, as shown clearly in Figs. 1 and 2, the levers B B being pivoted between the lower ends of the bars $a$ $a$ of each pair, and having forks C at their lower ends, constructed each with two or more tines, $e$.

The upper ends of the levers or arms B' B' have a metal loop, D, attached to them by the same pivot which connects them together, and in the upper end of this loop D a hook, $f$, is secured by a pivot, $g$.

E is a slotted bar, the lower end of which is attached, by a pivot, $h$, to the lower end of the loop D, and a ring, $i$, is formed at the upper end of the slotted bar, a rope or cord being attached to ring $i$. The lower end of the rod A is provided with a ring, $j$.

The operation is as follows: When the implement is down on the hay to be unloaded and elevated the levers B B' are free to move, and are not connected to rod A, and the two pairs of bars, $a$ $a$, may be distended or forced apart, and the forks C consequently distended, (see Fig. 2,) so that a requisite quantity of hay may be grasped by the forks, the operator thrusting the forks down into the hay on the loaded cart or wagon, and then adjusting the hook $f$ through the ring $j$ at the lower end of rod A, and turning up the bar E, so that the end of hook $f$ will pass through the slot in bar E. The implement is then hoisted through the medium of a horse and tackle arranged in the usual way, and the pull on the rod A closes the two forks C C, causing them to firmly grasp the hay, as will be understood by referring to Fig. 1. When the loaded fork has been elevated over the spot where the hay is to be discharged the operator pulls the rope attached to bar E, and thereby releases the hook $f$ and the levers B B' from the rod A, and the forks C C will part or separate under the gravity of the hay or load they contain, and the latter falls from the forks. The device or implement is then lowered by backing the horse, and the former again loaded or thrust into the hay on the load, the rod A connected with the levers B' B', and the device, with its load, elevated as before.

The device, it will be seen, is extremely simple, may be manufactured at a reasonable cost, and there are no parts liable to get out of repair or become deranged by use.

Having thus described our invention, what we claim as new, and desire to secure by Letters Patent, is—

The two pairs of bars $a$ $a$, pivoted at their upper ends to a cross-bar, $c$, in combination with the levers B B' and forks C C, connected or applied to the bars $a$ $a$ as shown, and provided at their upper ends with the hook $f$ and slotted bar E, or other equivalent fastening, to connect the rod A with the levers B B', all arranged substantially as and for the purpose set forth.

The above specification of our invention signed by us.

SAML. HARRIS.
DANL. A. HARRIS.

Witnesses:
T. P. BLAIR,
J. N. HAYS.